United States Patent Office 3,495,714
Patented Feb. 17, 1970

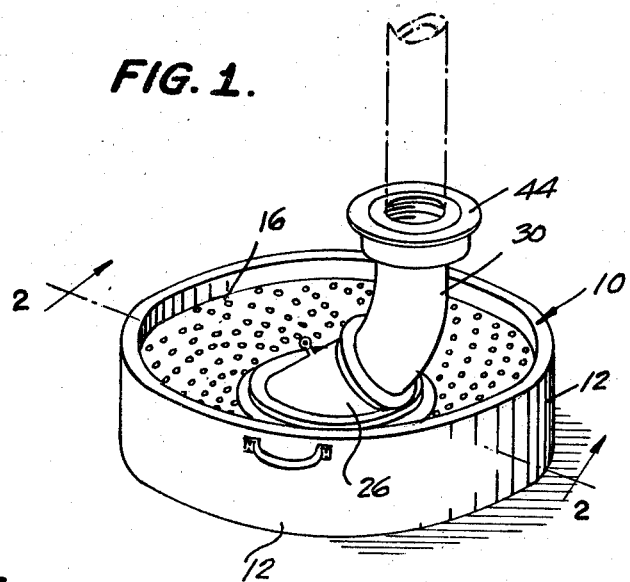
FIG. 1.
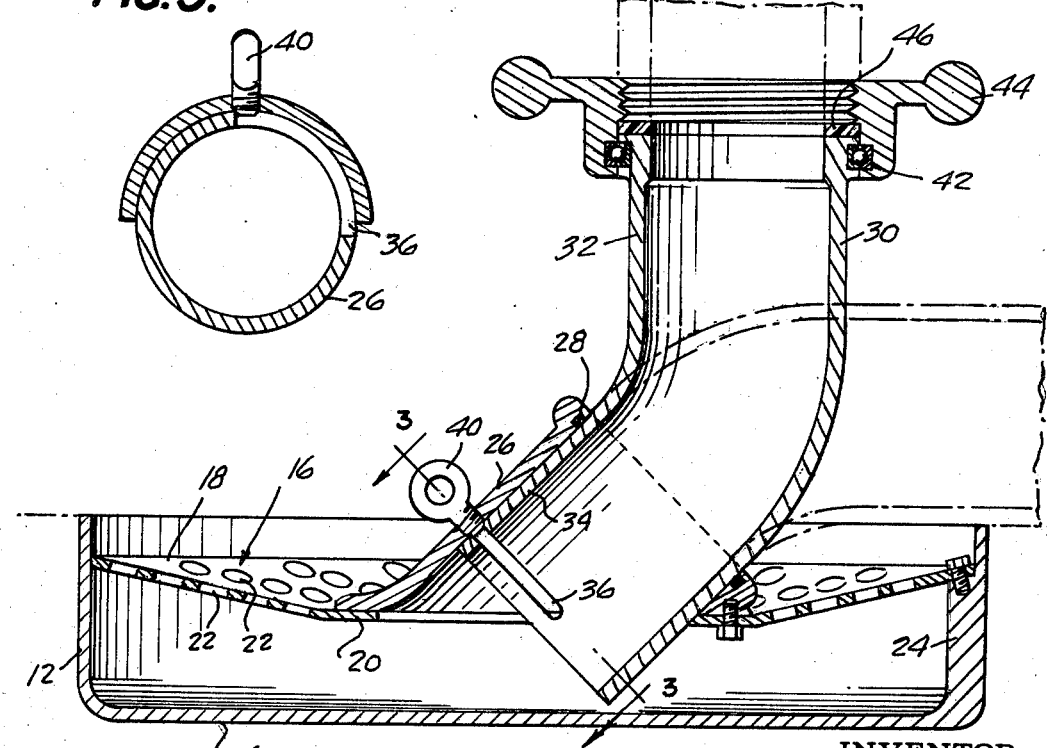
FIG. 3.
FIG. 2.
INVENTOR
EDWIN A. BARTON,
BY
ATTORNEYS

3,495,714
STRAINER DEVICE
Edwin A. Barton, 5 Skinner St.,
East Hampton, Conn. 06424
Filed Sept. 6, 1968, Ser. No. 758,053
Int. Cl. B01d 23/08
U.S. Cl. 210—460                               3 Claims

ABSTRACT OF THE DISCLOSURE

A strainer device comprising a bottom shaped like a steel drum including a non-perforated bottom and cylindrical sides with a perforated portion forming a strainer on the top and with means for connecting the strainer to a pump, including swivel means to permit a flexible connection so the strainer can be hooked up either vertically or horizontally.

---

The present invention relates to a strainer device and more particularly to a strainer device that may be used in connection with fire-fighting equipment and the like, where water is drawn from sources which may contain a large proportion of debris, trash and the like, as for example, rivers, creeks, reservoirs, and ponds.

It is an object of the present invention to provide a strainer that has a swivel adapter means which permits receiving of water from any position while still permitting the strainer to remain in a level position.

It is yet another object of the present invention to provide a strainer device which will not suck in mud or dirt or other debris because the bottom and the sides of the strainer device are solid and imperforate.

It is still another object of the present invention to provide a strainer device for taking a suction from the bottom of a pond or the like that may contain dirt and debris therein, in which the strainer device has perforations therein that have a volume of approximately six times the cross-sectional area through which the water is drawn out of the strainer device, so that any leaves or debris or any other foreign matter will not stick to the device and inadvertently clog up the openings, nor will it interferes with the pumping action.

It is yet another object of the present invention to provide a cylindrical strainer device for taking a suction from a pond or other body of water in which the device is of such a configuration so that it cannot be placed in an incorrect position because its cylindrical diameter is approximately five times its height and it is virtually impossible to tip over on its side.

It is another object of the present invention to provide a strainer device which works very well in shallow water and which permits the device to be used in many places, including an area such as a swamp.

Still another object of the present invention is to provide a strainer device comprising a substantially flat cylindrical configuration forming a flat, large pan and a perforated top with said top having perforations disposed substantially uniformly through the entire area thereof, so that water is drawn in over the whole area of the top.

The present invention further provides a strainer device having a swivel adapter connected thereto so that the swivel adapter can be rotated to a horizontal position or to a vertical position in order to connect it to a line for receiving the water after it has passed through the strainer in the present device.

Various other objects and advantages of the present invention will be readily apparent from the following detailed description when considered in connection with the accompanying drawing forming a part thereof, and in which:

FIGURE 1 is a perspective view illustrating the strainer device embodying the present invention;

FIGURE 2 is an enlarged section taken along the lines 2—2 of the FIGURE 1 illustrating, showing the swivel adapter in two different positions; and FIGURE 3 is a section taken along the lines 3—3 of FIGURE 2.

Referring to the drawings, the reference numeral 10 generally designates a strainer device having a cylindrical wall 12 with a flat bottom 14. The cylindrical wall 12 and the bottom 14 are solid or imperforate. The diameter of the device is approximately five times its height so that the wall 12 and the bottom 14 form a substantially cylindrical flat pan that is virtually impossible to tip over on its side.

Disposed adjacent the upper end of the device is a perforated plate member 16 having a slanted or tapered annular portion 18 adjacent the wall 12 and a substanitally horizontal center portion 20 adjacent the inner circumference of the annular portion 18. The plate 16 is provided with uniform circular perforations 22 substantially throughout its entire area and the outer edge of the plate is preferably bolted to ribs 24, only one of which is seen, formed in the wall 12.

The center portion 20 has disposed thereon angle connection 26. The angle 26 is preferably disposed at a 45-degree angle with respect to a plane passing through the center portion 20 and is preferably bolted to the portion 20. The angle connection 26 is further provided with an O-sealing ring 28 in its upper inner periphery.

Disposed within the angle connection 26 is an adapter 30 which has an upper portion 32 and a lower portion 34 which are disposed to form a 45-degree angle. The lower portion 34 is provided with a circumferential slot 36 therein adjacent its lower end, which extends for approximately 90 degrees in the portion 34. The angle connection 26 is provided with an I-bolt 40 threaded therein adjacent the slot 36 so that the I-bolt 40 will retain the adapter 30 after it is placed in position and to prevent it from becoming disassembled from the angle connection 26.

The upper end of the adapter 30 is provided with a recess therein which there is disposed a circular roller bearing 42. The roller bearing 42 and the adapter 30 and the strainer device 10 are all made of non-corrosive material. The bearing may be made of nylon material and the remaining portions of the device may be made of aluminum material, if desired.

A hand wheel 44, preferably made of urethane or other similar material is provided with a recess on its inner surface which receives the bearing 42. The interior of the threaded hand wheel 44 is provided with an annular sealing gasket 46.

Referring to FIGURE 2, the provision of the slot 36 and the provision of the 45-degree angle adapter 30 permits the adapter to be positioned vertically, as shown in solid lines in FIGURE 2, or to be disposed in a horizontal position, as shown in the dash-dot lines in FIGURE 2. After the position of the adapter is determined, the I-bolt 40 is threaded inwardly so that it seats against the surface of the slot 36 and securely maintains the adapter and the device in their proper position.

Thereafter, a hose is secured within the threaded portion of the hand wheel 44 and the strainer device is ready for use to pump water from a pond or a shallow body of water, as desired.

The wide uniform perforated plate 16 provides ample cross-sectional area through which the water can be sucked into a hose or other line that is secured to the hand wheel 44. Thus, the present invention has wide use in firefighting equipment where it is sometimes necessary to obtain water for putting out fires from any available source or body of water, whether the water is contaminated with debris and the like.

From the foregoing description of the invention, it is apparent that the present invention provides a strainer that has a swivel adapter that permits receiving of water from any position and at the same time prevents the strainer from being disposed in an incorrect position and by virtue of its large diameter with respect to its height, makes it virtually impossible to tip the strainer over on its side.

Inasmuch as various changes may be made in the relative arrangement, form and location of the parts without departing from the spirit of the invention, it is not meant to limit the scope of the invention except by the following claims.

What is claimed is:

1. A strainer device for use in a debris-filled body of water comprising a flat pan structure with an imperforate side wall and bottom and a perforated top with swivel adapter means secured to said top, said top being a perforated plate with an upwardly slanted outer portion and a flat central portion disposed at the lower end of said slanted portion, a 45-degree angled connection secured to said central portion, said adapter means being a 45-degree elbow member having its lower end telescoped within said angled connection and positioned adjacent said central portion and extending substantially to said bottom.

2. The device of claim 1 wherein said adapter has circumferential slot means therein and said angled connection has bolt means adapted to bear against said angled member to secure them together.

3. The device of claim 2 wherein bearing means are provided in the upper end of said angled member and threaded hand wheel means are journaled on said bearing means.

References Cited
UNITED STATES PATENTS

| | | | |
|---|---|---|---|
| 615,847 | 12/1898 | Hansen | 210—460 |
| 880,324 | 2/1908 | Parker | 285—272 |
| 2,192,438 | 3/1940 | Gulick | 210—460 X |
| 2,503,455 | 4/1950 | Sheven | 210—460 X |

REUBEN FRIEDMAN, Primary Examiner

T. A. GRANGER, Assistant Examiner